United States Patent
Rooney et al.

(10) Patent No.: US 11,429,611 B2
(45) Date of Patent: Aug. 30, 2022

(54) PROCESSING DATA OF A DATABASE SYSTEM

(71) Applicant: International Business Machines Corporation, Armonk, NY (US)

(72) Inventors: John G. Rooney, Zurich (CH); Luis Garcés Erice, Rueschlikon (CH); Peter Urbanetz, Au (CH); Daniel Nikolaus Bauer, Birmensdorf (CH); Florian Hermann Froese, Zurich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 162 days.

(21) Appl. No.: 16/580,130

(22) Filed: Sep. 24, 2019

(65) Prior Publication Data
US 2021/0089538 A1    Mar. 25, 2021

(51) Int. Cl.
*G06F 16/22*        (2019.01)
*G06F 16/2455*     (2019.01)
*G06F 16/2453*     (2019.01)

(52) U.S. Cl.
CPC .... *G06F 16/24552* (2019.01); *G06F 16/2282* (2019.01); *G06F 16/24535* (2019.01)

(58) Field of Classification Search
CPC ........... G06F 16/24552; G06F 16/2282; G06F 16/24535
See application file for complete search history.

(56) References Cited

U.S. PATENT DOCUMENTS

| | | | |
|---|---|---|---|
| 8,281,326 B2 * | 10/2012 | Foster | G06F 9/5055 719/330 |
| 9,734,201 B2 | 8/2017 | Shankar et al. | |
| 9,875,289 B2 | 1/2018 | Spratt | |
| 9,876,638 B2 | 1/2018 | Zhou et al. | |
| 2014/0143501 A1 * | 5/2014 | Creamer | G06F 12/0888 711/136 |

(Continued)

FOREIGN PATENT DOCUMENTS

| CN | 101587476 A | 11/2009 |
|---|---|---|
| CN | 106101090 A | 11/2016 |

(Continued)

OTHER PUBLICATIONS

Written Opinion and International Search Report, International Application No. PCT/IB2020/057933, dated Dec. 9, 2020, 6 pages.

*Primary Examiner* — William B Partridge
*Assistant Examiner* — Erich Alexander Fischer
(74) *Attorney, Agent, or Firm* — Scott Dobson (57) ABSTRACT

The present disclosure relates to a method for processing data of a database system, the database system being configured to connect to a centralized cache shared with other database systems. The method includes determining a unique identifier of the content of a table of the database system using a common identification method of the database systems. A database command may be generated for processing data of the table. The command references the identifier. It may be determined if the cache comprises results of a same command with the same identifier. The command may be processed at the database system or the results of the command may be retrieved from the cache depending on whether the cache comprises the results.

20 Claims, 4 Drawing Sheets

(56) References Cited

U.S. PATENT DOCUMENTS

2018/0025092 A1   1/2018   Aharonov et al.
2020/0175074 A1*  6/2020   Li ..................... G06F 12/0871

FOREIGN PATENT DOCUMENTS

CN          106570145 A    4/2017
CN          109656956 A    4/2019
WO          2003008612 A2  1/2003

* cited by examiner

PROCESSING DATA OF A DATABASE SYSTEM

BACKGROUND

The present disclosure relates to the field of digital computer systems, and more specifically, to a method for processing data of a database system.

A data lake is a system in which many types of data can be stored in a common platform such that it can be curated, combined and analyzed using a common set of tools. Data lakes are often formed of federations of independent systems which may run on multiple different sites, for example across a hybrid or multi-cloud. Often these independent systems are relational database systems executing on identical or similar datasets. However, there is need to improve operations of these independent systems.

SUMMARY

Various embodiments provide a method for processing data of a database system, database system, cache system and computer program product as described by the subject matter of the independent claims. Advantageous embodiments are described in the dependent claims. Embodiments of the present invention can be freely combined with each other if they are not mutually exclusive.

In one aspect, the disclosure relates to a method for processing data of a database system, the database system being configured to connect to a centralized cache (or cache) shared with other database systems. The database systems are configured to connect to the cache. The method includes receiving a request for processing data of at least one table of the database system. A unique identifier of a version of the table is determined using a common identification method of the database systems. A database command for processing data of the table is generated, the command referencing the identifier. It is determined if the cache comprises results of a same command with the same identifier. The command is processed at the database system or the results of the command are retrieved from the cache depending whether the cache comprises the results.

In another aspect, the disclosure relates to a method for processing data of a database system, the database system being configured to connect to a centralized cache shared with other database systems. The method includes receiving a request for processing data of multiple tables of the database systems. For each of the multiple tables, a unique identifier of a version the table is determined using a common identification method of the database systems. A database command for processing data of the multiple tables is generated, the command referencing the multiple identifiers. The command is decomposed into multiple subcommands that independently process tables of the multiple tables. It is determined if the cache includes results of the same command or results of each of the subcommands. In case the results of the subcommands and the command are not present in the cache, the generated command is processed. In case the results of the generated command are not present in the cache and the results of at least one of the subcommands are present in the cache: the at least one of the subcommands are processed or their results are retrieved from the cache; the subcommands are processed for which the results are not present in the cache; and the results of the subcommands are combined in accordance with the command in order to obtain the results of the command. In case the results of the generated command are present in the cache, the command is processed or its results are retrieved from the cache.

In another aspect, the disclosure relates to a computer program product including a computer-readable storage medium having computer-readable program code embodied therewith, the computer-readable program code configured to implement the method according to preceding embodiments.

In another aspect, the disclosure relates to a system including a database system configured to connect to a centralized cache shared with other database systems; one or more processors; and a computer-readable storage medium, coupled to the one or more processors, storing program instructions that, when executed by the one or more processors, cause the one or more processors to perform the method according to the preceding embodiments.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

DETAILED DESCRIPTION

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present subject matter may save processing resources in database systems by using a centralized query memorization between a set of independent database systems. The present subject matter provides a distributed cache such that partial results can be shared between the database systems. This may prevent recalculating previously processed queries. This may particularly be advantageous in a data lake. For example, the database system and the other database systems may be part of the data lake.

For example, each database system of the database systems is configured to store, in the cache, results of each query executed in the database system in association with a description of the query. For example, each entry in the cache may be associated with a query that is executed in a respective database system of the database systems, wherein the entry may comprise a description of the query, an identifier of the table being referenced in the query and the results of the query. The common identification method of the database systems is a function that is used by each of the database systems to generate unique identifiers from content of a table. The method as described herein may be performed by each database system of the database systems.

The centralized cache may, for example, be a distributed cache that spans multiple servers so that it can grow in size and in transactional capacity. Each of the database systems may be configured to remotely connect to the centralized cache.

The version of the table is the current or last version of the table at the database system. The version of the table may be a unique version name or unique version number that uniquely identify the content (or a state) of the table.

According to embodiments, the method further comprises comparing a processing cost of processing the command by the database system with a retrieving cost of retrieving the results from the cache to the database system and based on the comparison result performing the processing of the command at the database system or retrieving the results of the command from the cache. These embodiments may enable performing a cost check for the database command, wherein the results of the cost check indicate if the processing cost of the database command is higher than the retrieving cost of the results of the database command from the cache.

For example, a query planner at the database system receives an indication of which sub-queries have already been calculated and are present in the cache and then makes a local decision to determine if the estimated cost of recalculating sub-queries present in the cache is exceeded by the estimate cost of transferring the result locally.

The processing and retrieving costs may refer to an amount of processing resources such as CPU and network bandwidth. The processing and the retrieving cost may have a normalized value e.g. within interval [0, 1]. Depending on the task to be performed, the cost may be estimated by identifying the processing resources involved in the task. For example, for the transfer of data over a network the resources may be the network bandwidth, CPU, memory etc. The cost may be estimated using those identified resources and the resulting cost may be normalized so that it can be compared with other costs of different tasks.

These embodiments may be advantageous as it may save processing resources in the database system compared to other database systems that always recalculate the queries without having the possibility of retrieving results from the cache.

According to embodiments, the method further comprises: receiving at the database system a query; determining by a query planner of the database system a query plan for the query, the query plan comprising at least one subquery referencing the table; wherein generating the database command comprises replacing the name of the table by the identifier in the subquery resulting in the database command. The replacing of the name of the table by the identifier in the subquery results in the database command.

If the at least one subquery comprises multiple subqueries, the generation of the command may be performed for each of the multiple subqueries by replacing the table name in each of the multiple subqueries by the determined identifier and by determining if the cache comprises the results of each of the generated commands. The cost check may be applied for each of the generated database commands. Depending on the result of the cost check, each of the generated commands may be processed at the database system or the results of that generated database command may be retrieved from the cache (if they exist in the cache).

In another example, all subqueries of the query plan may be processed using the present method, namely, for each distinct referenced table in the subqueries of the query plan a unique identifier may be determined and for each subquery of the query plan a command may be generated by replacing the table name in the subquery by the respective identifier. For each generated command it may be determined if corresponding results are already present in the cache. The execution of each of the commands or the import of its results from the cache may be decided based on the cost check. This may enable a systematic and automatic method. Since each subquery of the query plan is automatically processed regardless of whether it references a shared table, this may save additional resources that would otherwise be required to check which queries are referencing the shared tables.

The query plan (or query execution plan) may be an ordered set of steps (e.g., each step may be a performed by a subquery) used to access data. These embodiments may be advantageous as they may seamlessly be integrated in existing systems. An existing query planner may be configured in accordance with the present subject matter to replace the names of tables by the respective unique identifiers in the subqueries of the query plan.

For example, the query plan comprises multiple subqueries sq1, sq2, sq3 and sq4. The subqueries sq1 and sq2 refer to the table and sq3 and sq4 refer to different tables. In one example, the subqueries sq1 and sq2 that refer to the table may be identified. The unique identifier may be determined only once for the table of sq1 and sq2, two commands may be generated for sq1 and sq2, and the check if the cache comprises results may be performed for all generated commands. In another example, the identifier may be generated for each distinct table of subqueries sq1, sq2, sq3 and sq4, four commands may be generated for sq1, sq2, sq3 and sq4, and the check if the cache comprises results may be performed for all generated commands. The processing of each of the four database commands or the retrievals of their results from the cache (if they exist) may be performed based on the results of the cost check of each of the four database commands.

According to embodiments, the query plan comprises multiple subqueries referencing different tables, the method further comprises identifying the at least one subquery using the name of the table.

Instead of replacing the table names in each subquery of the query plan, only table names of subqueries that are referencing tables that are shared with other database systems may be replaced. This may save processing resources that would otherwise be required for processing all subqueries although they are not present in the cache.

According to embodiments, the query plan comprises further subqueries referencing the table and the method further comprises generating a further database command for each of the further subqueries by replacing the name of the table by the identifier in the further subquery and repeating the second determining step and the processing step for each of the further generated commands. Using the same identifier that is generated only once for all the subqueries may save processing resources compared to the case where each subquery of these subqueries is processed separately.

According to embodiments, the query plan comprises further subqueries referencing different tables of the database system and the method further comprises identifying in the multiple subqueries, subqueries referencing tables which are shared with other database systems and repeating the determination of the identifier for each distinct table of the different tables and repeating the generating step, second determining step and the processing step for each of the identified subqueries.

For example, the query plan comprises multiple subqueries sq1, sq2, sq3 and sq4. Only the subqueries sq1, sq2 and sq3 refer to tables that are shared with the other database systems. For example, sq1 and sq2 refer to the same table while sq3 refers to a different table, but both tables are shared with the other database systems. In this case, the subqueries sq1, sq2 and sq3 that refer to shared tables may be identified and a unique identifier may be determined only once for the table of sq1 and sq2 and another unique identifier may be determined for the table of sq3. Three commands may be generated for sq1, sq2 and sq3 and the check if the cache comprises the results of each of the generated commands may be performed as described herein. The processing of each of the three database commands or the retrievals of their results from the cache (if they exist) may be performed based on the results of the cost check of each of the three database commands.

According to embodiments, the method further comprises, before determining the identifier, determining that the table is shared with at least part of the other database systems.

If the table is not shared with other database systems there may be no need to waste resources querying the cache as queries referencing that table are not present in the cache. The table is shared with other database systems means that the other database systems comprise the table. The last version of the table in each of the database systems may or may not be the same.

According to embodiments, the identifier of the table is determined using an ID table mapping table names to respective unique identifiers, e.g., the identifier is read or retrieved from the ID table.

The ID table may map the table name to a unique identifier such as a UUID that is derived from the content of the respective table having that table name. This unique identifier may be calculated from the data itself, for example, by applying a hash. For example, the ID table may be a centralized table accessible by different database systems. This may enable that the IDs can be generated in a centralized manner. For example, the ID table may be generated by a single system for each of the database systems. In another example, the ID table may be a universal version table present at each database system of the database systems. Thus, each independent database system may maintain this ID table independently of every other one.

According to one embodiment, the method further comprises determining the identifier comprising applying a hash function on the current content of the table for generating the identifier. The table may have different versions. The current content of the table may be the last version of the table. This may be advantageous as it enables consistent data processing results among independent database systems such as database systems of a data lake.

According to embodiments, the cache comprises a lookup table having textual descriptions of queries as keys and results of the queries as values, wherein determining if the cache comprises the results of the command comprises creating a textual description of the command and querying the lookup table using the textual description.

According to embodiments, the values of the lookup table are representations of materialized query table (MQT) tables. In one example, the values of the lookup tables may be links or references of parquet files comprising MQTs. This may enable a seamless integration of the present method in exiting systems. For example, the present method may make use of an infrastructure that creates the MQTs for generating the content of the cache. This may save processing resources that would otherwise be required for building the system from scratch.

According to embodiments, the database system comprises further tables, and the method further comprises repeating the method for one or more tables of the further tables. For example, if another request for processing another table is received, the unique identifier may be created from the other table, the command may be generated for the received request referencing that unique identifier and the second determining step and the processing or the retrieving step may be repeated for the generated command.

According to embodiments, the receiving of the request is performed before or after the determining of the unique identifier. Determining the unique identifier before receiving the request may speed up the process of executing the request as the unique identifier is already prepared. Determining the unique identifier after receiving the request may save processing resources that would otherwise be required to determine unique identifiers for tables that are not requested.

Figure 1:
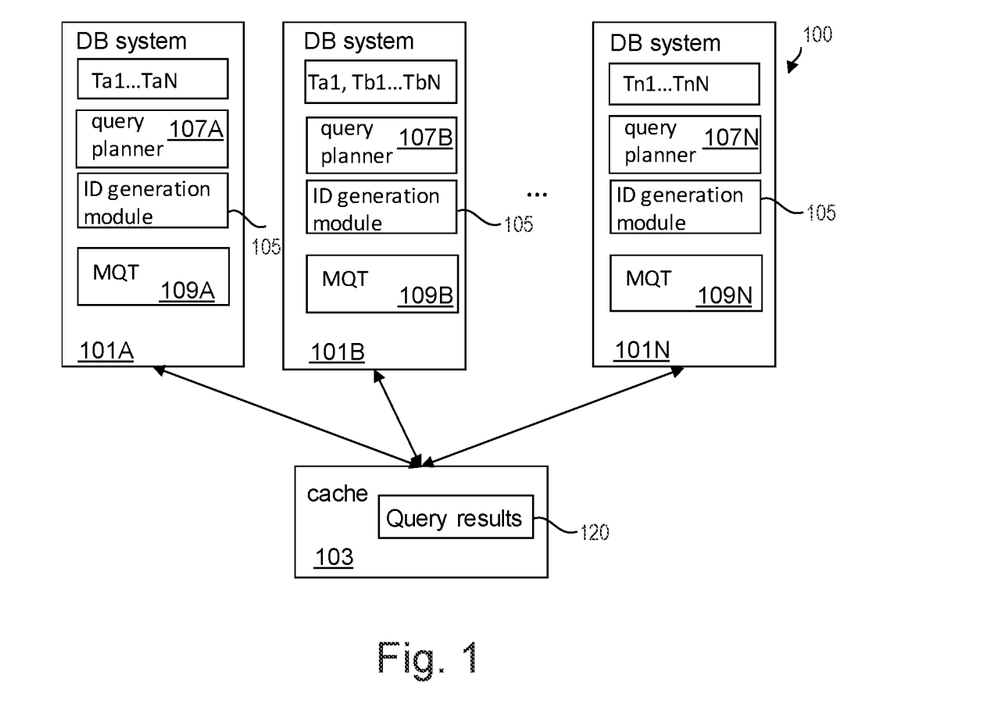
FIG. 1 depicts is a block diagram of a computer system for accessing data stored in multiple databases, according to embodiments.

FIG. 1 is a block diagram of a computer system 100 for accessing data stored in multiple databases, according to embodiments. The computer system 100 comprises multiple database systems 101A-N. Each of the database systems 101A-N may, for example, be a relational database system such as DB2, Oracle and MySQL system.

Each of the database systems 101A-N may comprise respective data tables. For example, the database system 101A comprises tables Ta1 . . . TaN. The database system 101B comprises tables Ta1, Tb1 . . . TbN and the database system 101N comprises tables Tn1 . . . TnN. As shown in FIG. 1, the database systems 101A-B share the same table Ta1. Tables of the database systems 101A-N may periodical, sporadically, or occasionally be updated meaning that a version is associated with each table. Each table of the tables in the database systems 101A-N may have a version number indicative of its current content. Each database system 101A-N executes a set of queries on the most recent version of the tables present on that system. For example, although the database systems 101A-B share the same table Ta1, it may happen that they comprise different versions of the table Ta1.

For example, each of the database systems 101A-N comprises an ID generating module 105. The ID generating module 105 may, for example, be configured to generate a unique ID using the common identification method. For example, the ID generating module 105 may be configured to receive input data and generate a unique identifier from the input data. As it is present in each of the database systems 101A-N, the ID generating module 105 may enable generating the IDs in the database systems 101A-N in a consistent manner. For example, if the same version of table Ta1 is present in the database systems 101A and 101B, the IDs that are generated from Ta1 in each of the database systems 101A-B are the same.

In another example, in addition to the ID generating module 105 or alternatively, an ID table may be provided in each of the database systems 101A-N. The ID table maps unique identifiers to table names of tables of respective database systems. The unique identifiers of the ID table may, for example, be determined by the ID generating module 105 or by another system using the common identification method.

Each of the database systems 101A-N may comprise a query planner 107A-N. Each of the query planners 107A-N may be configured to determine query plans for each received query at the respective database system 101A-N. For example, a received non-trivial query may be decomposed into a set of sub-queries by the query planner. The sub-queries may then be scheduled and executed such that independent sub-queries may be executed in parallel.

For example, a received query Q1 at the database system 101A such as: SELECT from Ta1 INNER JOIN Ta2 where Ta1.X>10 AND Ta2.Y>20; may be decomposed by the query planner 107A into one sub-query Q1_1 that selects rows from table Ta1 and one subs-query Q1_2 that selects rows from Ta2 before performing the JOIN. In another example, a received query Q2 at the database system 101B such as: SELECT from Ta1 INNER JOIN Tb3 where Ta1.X>10 AND Tb3.Z>30; may be decomposed by the query planner 107B into one sub-query Q2_1 that selects rows from table Ta1 and one subs-query Q2_2 that selects rows from Tb3 before performing the JOIN. This results in the two query plans comprising the same subquery, namely the first sub-query Q1_1 of the query Q1 is the same as the first subquery Q2_1 of the query Q2. By memorizing the result of the first subquery of one of the two query plans, it can be reused by the other query plan so that significant computations can be avoided at the computer system 100. For that, each database system can use materialized query table (MQTs) 109A-N stored locally in each of the database systems 101A-N. For example, processes of the database system may measure how frequently queries and subqueries are executed and create MQTs locally at the database system. Each MQT 109A-N stores the results of queries executed in the respective database system. In addition, and in order to reuse results in a MQT (e.g. 109A) calculated on a database system (e.g. 101A) by another database system 101B-N, a centralized cache 103 is provided in the computer system 100 for storing the results of MQTs. Each of the database systems 101A-N may be configured to connect to the centralized cache 103. The connection may for example include a direct connection, bus connection, local area network (LAN) connection, internet connection, a combination thereof and the like.

The centralized cache system 103 may enable a memorization of the results 120 of queries executed at each of the database systems 101A-N. This may allow partial results of a calculation to be stored such that other calculations can automatically use those partial results without having to recalculate them. For example, the cache 103 may comprise a mapping of MQTs 109A-N and respective queries. The cache 103 may consist of a lookup table that has the text of the query as key and a representation of the MQT as a value. The text of the query may comprise the unique identifier that is referenced in the query. This may be advantageous, for the following reasons. On a database system there is limited storage so the benefit of keeping an MQT may need to be traded against the storage cost. An advantage of the present subject matter is that the distributed cache can be arbitrarily large, meaning the MQTs need not be removed as often. For example, each time a query is submitted, a query planner determines a standard query plan, but also one that replaces the table names with the respective UUIDs. This may result in an extended query plan. The sub-queries of this extended query plan may then be submitted to the centralized cache where a textual lookup is performed to see if the corresponding subquery is already present, as the textual description of the subquery contains the UUIDs rather than the tables names, it is universally unique. In one example each of the database system 101A-N may be configured to generate a textual description of a query using a same textual description generation method as the one used by the cache 103 to create the lookup table. The database systems may query the cache using those textual descriptions. In another example, the database system may send a query as generated to the cache and the cache may generate a textual description of the received query before performing a search in the lookup table for determining of there are results of the query stored at the cache.

Figure 2:
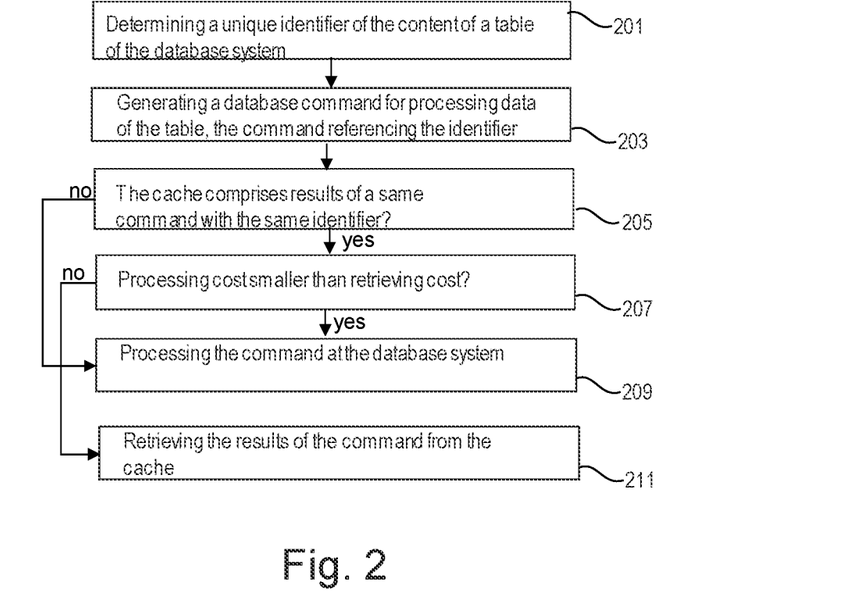
FIG. 2 is a flowchart of a method for processing data of a database system, according to embodiments.

FIG. 2 is a flowchart of a method for processing data of database system, according to embodiments. The method of FIG. 2 is described with reference to database system 101A and table Ta1 for exemplification purpose only, but it may be performed by any of the database systems 101A-N and for other tables.

For example, the method of FIG. 2 may automatically be performed upon receiving at the database system 101A a request for processing the table Ta1. In another example, the method of FIG. 2 may automatically be performed as soon as table Ta1 is stored or changed. In another example, the method of FIG. 2 may automatically be performed on a periodic basis and the database system 101A may be configured to check every hour or every day new tables or changed tables of the database system 101A and upon detecting a change or a new table Ta1 the method may be performed on the changed table Ta1 or the new table Ta1.

In step 201, a unique identifier (ID1) of the content of the table Ta1 may be determined using a common identification method of the database systems 101A-N. For example, the ID generation module 105 may generate a unique ID from the content of the table Ta1. For that, a hash function may be applied on the current content of the table Ta1 (last version of Ta1) for generating the unique identifier. The unique identifier of the table Ta1 may be the hash value generated by the hash function from the table Ta1. This may be advantageous as data of table Ta1 that are present in another database system may generate the same hash value.

In another example, the unique identifier ID1 may be read from the ID table of the database system 101A. The unique identifier ID1 may be the identifier of the ID table that is associated with a table name which is the table name of table Ta1.

In step 203, a database command may be generated or determined by the database system 101A for processing data of the table Ta1. The database command may reference the unique identifier of step 201 for indicating the table Ta1. The database command may, for example, use an SQL statement as follows: SELECT from ID1 where ID1.X>10. In one example, the database command may automatically be generated using the content of the received request. In another example, the database command may be a copy of a predefined command that it is to be regularly performed on new stored data or changed data, e.g., as soon as Ta1 is stored the predefined command may be executed, e.g., after the unique ID of the table is inserted in the command.

Before deciding to execute the generated database command, the database system 101A may determine in inquiry step 205, if the cache 103 comprises results of a same command with the same identifier ID1. Since the database system 101B also comprises the table Ta1 it may happen that the same command has been executed on the database system 101B, and its results may have been stored in the cache 103 in accordance with the present subject matter.

If there are no results of the generated database command at the cache 103, the database command may be processed or executed in step 209 at the database system 101A.

If there are results of the generated database command at the cache 103, it may be determined in inquiry step 207 if a processing cost of processing the command by the database system 101A is higher than a retrieving cost of transferring the results from the cache 103 to the database system 101A.

If the processing cost of processing the command by the database system 101A is higher than the retrieving cost of transferring the results from the cache 103, the results of the command may be retrieved in step 211 from the cache; otherwise the processing of the command at the database system of step 209 may be performed.

Figure 3A:
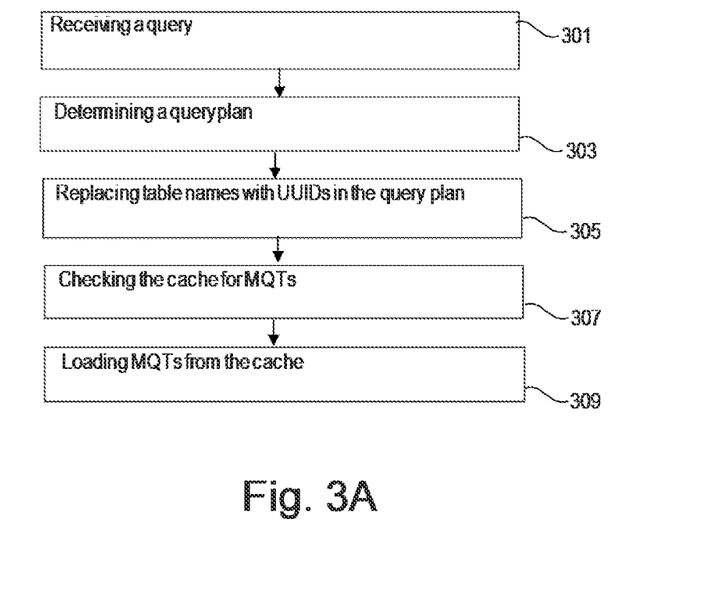
FIG. 3A is a flowchart of a method for processing data of a database system, according to embodiments.

FIG. 3A is a flowchart of a method for processing data of a database system, according to embodiments. The method of FIG. 3A is described with reference to database system 101A and table Ta1 for exemplification purpose only, but it may be performed by any of the database systems 101A-N and for other tables.

In step 301, a query may be received at the database system 101A. The query may, for example, be as follows: SELECT from Ta1 INNER JOIN Ta2 where Ta1.X>10 AND Ta2.Y>20.

In step 303, a query plan may be determined for the received query by the query planner 107A. For example, the received query SELECT from Ta1 INNER JOIN Ta2 where Ta1.X>10 AND Ta2.Y>20 may be decomposed by the query planner 107A into one sub-query Q1_1: SELECT from Ta1 where Ta1.X>10 that selects rows from table Ta1 and one subs-query Q1_2: SELECT from Ta2 where Ta2.Y>20 that selects rows from Ta2 before performing the JOIN.

In step 305, at least part of the subqueries of the query plan may be processed in order to replace the table names of the at least part of the subqueries by their respective unique identifiers. Step 305 may be performed for each subquery of the query plan. This may prevent further selection checks. In another example, only subqueries referring tables that are shared with other database systems 101A-N may be processed to replace their table names. This may save processing resources that would otherwise be required for requesting the cache for results of queries on tables that are not shared (and thus are not cached). In this example, only subquery Q1_1 references a table Ta1 that is shared between two database systems 101A-B.

Thus, following the above example, the subquery Q1_1 may be processed to replace the table name Ta1 by the unique identifier ID1. The unique identifier ID1 may be generated using the ID generating module 105. In another example, the ID table of the database system 101A may be used to read the ID1 from the ID table. The processed subquery Q1_1 may be as follows: SELECT from ID1 where ID1.X>10.

In step 307, the cache 103 may be checked to determine if the results of the processed subqueries of step 305 are already present in the cache 103. Following the above example, it may be determined if the results of the subquery SELECT from ID1 where ID1.X>10 are stored in the cache 103.

Figure 3B:
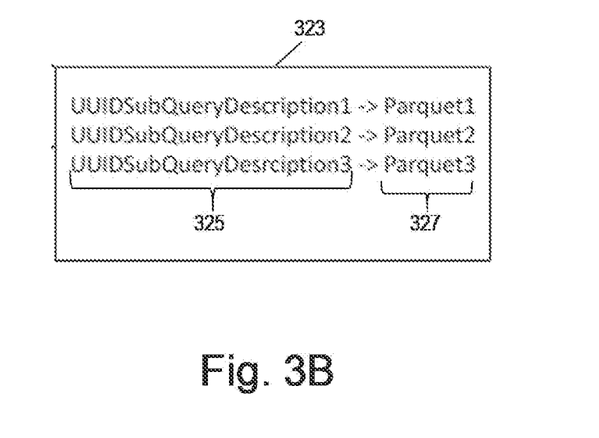
FIG. 3B is a block diagram of a lookup table of query results, according to embodiments.

For that, a lookup table 323 of the cache 103 as shown in FIG. 3B may be used. The lookup table 323 comprises textual descriptions 325 of queries as keys and results 327 of the queries as values. For example, the cache consists of a lookup table that has the text of the query as a key and a representation of the MQT as a value. For example, one representation of the MQT is a parquet file. This may enable keeping query results, e.g., a representation of MQTs, within a distributed cache with universal unique keys. The textual descriptions 325 are further indicative of the unique identifiers of the tables of the respective queries. Determining if the cache comprises the results of the command comprises the creation of a textual description of the processed subqueries and the query of the lookup table 323 using the created textual descriptions. Following the above example, a textual description of the subquery SELECT from ID1 where ID1.X may be created and the lookup table 323 may be searched for the created textual description. The textual description of the subquery contains the unique identifier ID1.

The query planner 107A at the database system 101A receives an indication of which sub-queries have already been calculated and that are present in the cache 103. The results that are found in the cache 103 may be loaded in step 309 by the database system 101A from the cache 103. The loaded results may be made local MQT. This process involves replacing the identifiers (e.g. UUIDs) with the respective table names.

Figure 4:
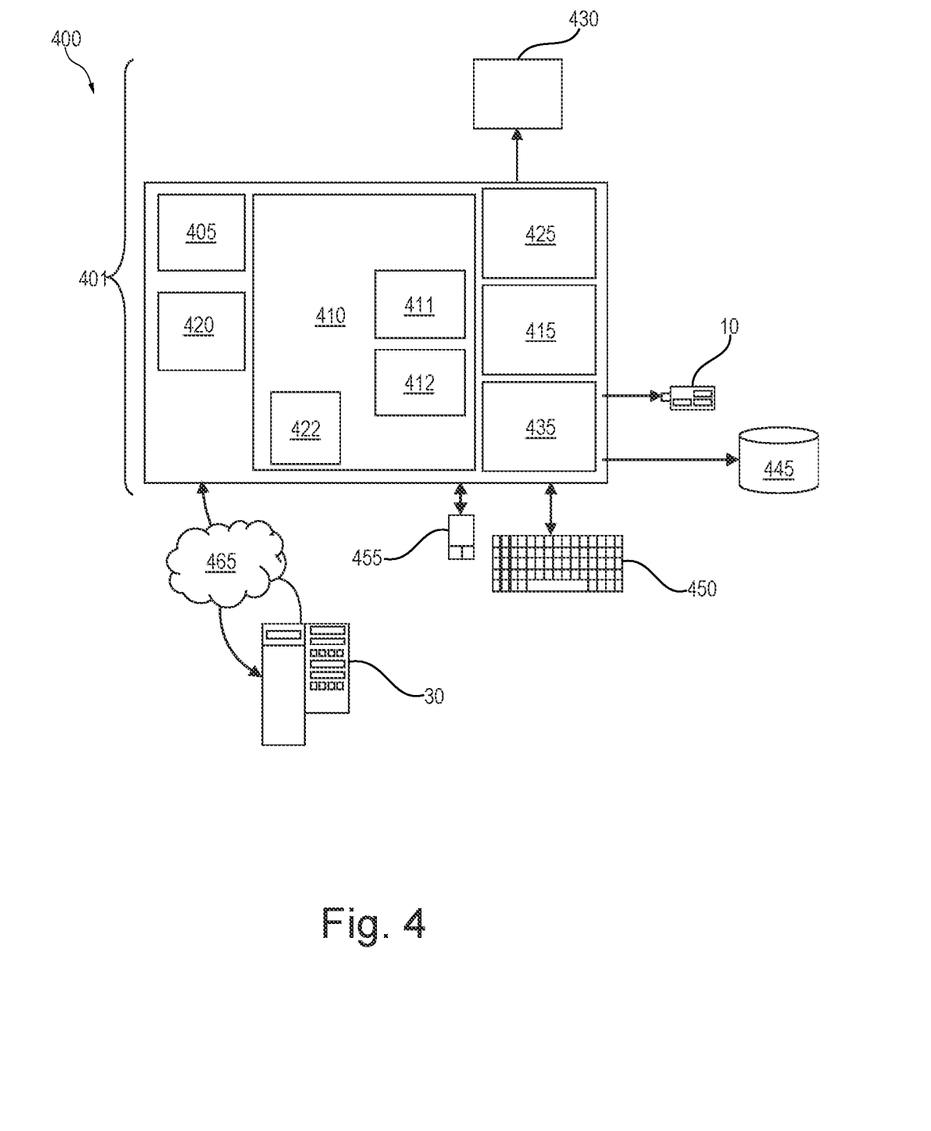
FIG. 4 represents a computerized system, suited for implementing one or more method steps, according to embodiments.

FIG. 4 represents a general computerized system 400 such as database system 101A suited for implementing method steps according to embodiments.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 412, 422 (including firmware 422), hardware (processor) 405, or a combination thereof. In exemplary embodiments, the methods described herein are implemented in software, as an executable program, and is executed by a special or general-purpose digital computer, such as a personal computer, workstation, minicomputer, or mainframe computer. The most general system 400 therefore includes a general-purpose computer 401.

In exemplary embodiments, in terms of hardware architecture, as shown in FIG. 4, the computer 401 includes a processor 405, memory (main memory) 110 coupled to a memory controller 415, and one or more input and/or output (I/O) devices (or peripherals) 10, 445 that are communicatively coupled via a local input/output controller 435. The input/output controller 435 can be, but is not limited to, one or more buses or other wired or wireless connections, as is known in the art. The input/output controller 435 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 445 may generally include any generalized cryptographic card or smart card known in the art.

The processor 405 is a hardware device for executing software, particularly that stored in memory 410. The processor 405 can be any custom made or commercially available processor, a central processing unit (CPU), an auxiliary processor among several processors associated with the computer 401, a semiconductor based microprocessor (in the form of a microchip or chip set), a macroprocessor, or generally any device for executing software instructions.

The memory 410 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 410 can have a distributed architecture, where various components are situated remote from one another, but can be accessed by the processor 405.

The software in memory 410 may include one or more separate programs, each of which comprises an ordered listing of executable instructions for implementing logical functions, notably functions involved in embodiments of this invention. In the example of FIG. 4, software in the memory 410 includes instructions 412 e.g. instructions to manage databases such as a database management system.

The software in memory 410 shall also typically include a suitable operating system (OS) 111. The OS 411 essentially controls the execution of other computer programs, such as possibly software 412 for implementing methods as described herein.

The methods described herein may be in the form of a source program 412, executable program 412 (object code), script, or any other entity comprising a set of instructions 412 to be performed. When a source program, then the program needs to be translated via a compiler, assembler, interpreter, or the like, which may or may not be included within the memory 410, so as to operate properly in connection with the OS 411. Furthermore, the methods can be written as an object oriented programming language, which has classes of data and methods, or a procedure programming language, which has routines, subroutines, and/or functions.

In exemplary embodiments, a conventional keyboard 450 and mouse 455 can be coupled to the input/output controller 435. Other output devices such as the I/O devices 445 may include input devices, for example but not limited to a printer, a scanner, microphone, and the like. Finally, the I/O devices 10, 445 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 445 can be any generalized cryptographic card or smart card known in the art. The system 400 can further include a display controller 425 coupled to a display 430. In exemplary embodiments, the system 400 can further include a network interface for coupling to a network 465. The network 465 can be an IP-based network for communication between the computer 401 and any external server, client and the like via a broadband connection. The network 465 transmits and receives data between the computer 401 and external systems 30, which can be involved to perform part or all of the steps of the methods discussed herein. In exemplary embodiments, network 165 can be a managed IP network administered by a service provider. The network 165 may be implemented in a wireless fashion, e.g., using wireless protocols and technologies, such as WiFi, WiMax, etc. The network 465 can also be a packet-switched network such as a local area network, wide area network, metropolitan area network, Internet network, or other similar type of network environment. The network 465 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 401 is a PC, workstation, intelligent device or the like, the software in the memory 410 may further include a basic input output system (BIOS) 422. The BIOS is a set of essential software routines that initialize and test hardware at startup, start the OS 411, and support the transfer of data among the hardware devices. The BIOS is stored in ROM so that the BIOS can be executed when the computer 401 is activated.

When the computer 401 is in operation, the processor 405 is configured to execute software 412 stored within the memory 410, to communicate data to and from the memory 410, and to generally control operations of the computer 401 pursuant to the software. The methods described herein and the OS 411, in whole or in part, but typically the latter, are read by the processor 405, possibly buffered within the processor 405, and then executed.

When the systems and methods described herein are implemented in software 412, as is shown in FIG. 4, the methods can be stored on any computer readable medium, such as storage 420, for use by or in connection with any computer related system or method. The storage 420 may comprise a disk storage such as HDD storage.

Figure 5:
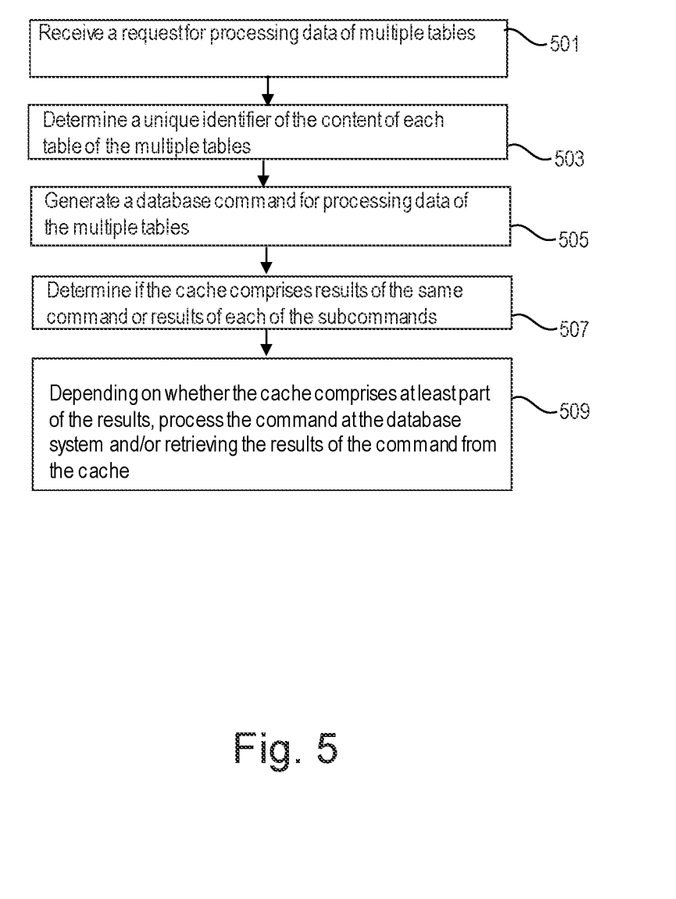
FIG. 5 is a flowchart of a method for processing data of a database system, according to embodiments.

FIG. 5 is a flowchart of a method for processing data of a database system, according to embodiments. The database system is configured to connect to a centralized cache shared with other database systems.

A request for processing data of multiple tables (e.g. DT1 and DT2) of the database system is received in step 501.

In step 503, a unique identifier of a version of each of the multiple tables may be determined using a common identification method of the database systems. This may for example result in unique identifiers ID_DT1 and ID_DT2 for tables DT1 and DT2 respectively.

A database command for processing data of the multiple tables may be generated in step 505. The generated command references the multiple determined unique identifiers of step 503. For example, the database command may reference both ID_DT1 and ID_DT2 e.g. the database command may require: SELECT from ID_DT1 INNER JOIN ID_DT2 where ID_DT1.X>10 AND ID_DT2.Y>20.

In step 507, it may be determined if the cache comprises results of at least part of the same generated command.

The determining of step 507, may comprise decomposing the generated command into multiple subcommands that independently process data of the multiple tables respectively. Following the above example, the two subcommands may be as follows SELECT from ID_DT1 where ID_DT1.X>10 and SELECT from ID_DT2 where ID_DT2.Y>20.

The determining step 507 comprises determining if the results of exactly the same command exist in the cache and/or determining if the results of each of the subcommands exist in the cache.

In step 509, it may be decided, depending on whether the cache comprises at least part of the results, to process the command at the database system and/or to retrieve the results of the command from the cache.

For example, in case the results of the subcommands and the command are not present in the cache, the generated command may be processed in step 509.

In case the results of the generated command are not present in the cache and the results of at least one of the subcommands are present in the cache, the at least one of the subcommands may be processed or their results may be retrieved from the cache. Processing the at least one of the subcommands or retrieving the results of the at least one of the subcommands may, for example, be performed based on the result of the cost check on the at least one of the subcommands. In addition, the subcommands for which the results are not present in the cache are processed locally at the database system; and the results of the subcommands are combined or used in accordance with the command in order to obtain the results of the command. Following the above example, if the results of the two subcommands SELECT from ID_DT1 where ID_DT1.X>10 and SELECT from ID_DT2 where ID_DT2.Y>20 are obtained, the results may be used in order to perform the JOIN operation of the command that is decomposed into the the two subcommands. That command is SELECT from ID_DT1 INNER JOIN ID_DT2 where ID_DT1.X>10 AND ID_DT2.Y>20.

In case the results of the generated command are present in the cache, the command may locally be processed at the database system or its results may be retrieved from the cache. Processing the command or retrieving the results of the command may for example be performed based on the result of the cost check on the command.

Various embodiments are specified in the following numbered clauses.

1. A method for processing data of a database system, the database system being configured to connect to a centralized cache shared with other database systems; the method comprising: receiving a request for processing data of at least one table of the database system; determining a unique identifier of a version of the table using a common identification method of the database systems; generating a database command for processing data of the table, the command referencing the identifier; determining if the cache comprises results of a same command with the same identifier; processing the command at the database system or retrieving the results of the command from the cache depending whether the cache comprises the results.

2. The method of clause 1, further comprising comparing a processing cost of processing the command by the database system with a retrieving cost of retrieving the results from the cache and based on the comparison result performing the processing of the command at the database system or the retrieving of the results of the command from the cache.

3. The method of any of the preceding clauses, further comprising: receiving at the database system a query; determining by a query planner of the database system a query plan for the query, the query plan comprising a subquery referencing the table; wherein the generated database command results from replacing the name of the table by the identifier in the subquery.

4. The method of clause 3, the query plan comprising multiple subqueries referencing different tables, the method further comprising identifying the subquery using the name of the table.

5. The method of clause 3, the query plan comprising further subqueries referencing the table, the method further comprising generating a further database command for each of the further subqueries by replacing the name of the table by the identifier in the further subquery, and repeating the second determining step and the processing step for each of the further generated commands.

6. The method of clause 3, the query plan comprising further subqueries referencing different tables of the database system, the method further comprising identifying in the further subqueries, subqueries referencing tables which are shared with other database systems; repeating for each distinct table of the tables referenced in the identified subqueries and repeating the generating step, second determining step and the processing step for each of the identified subqueries.

7. The method of any of the preceding clauses, further comprising before determining the identifier determining that the table is a shared with at least part of the other database systems.

8. The method of any of the preceding clauses, wherein the identifier of the table is determined using an ID table mapping table names to respective unique identifiers.

9. The method of any of the preceding clauses, wherein determining the identifier comprises applying a hash function on the current content of the table for generating the identifier.

10. The method of any of the preceding clauses, the cache comprising a lookup table having textual descriptions of queries as keys and results of the queries as values, wherein determining if the cache comprises the results of the command comprises creating a textual description of the command and querying the lookup table using the textual description.

11. The method of any of the preceding clauses, the database system comprising further tables, the method further comprising repeating the method for one or more tables of the further tables.

12. The method of any of the preceding clauses, wherein the receiving of the request is performed before or after the determining of the unique identifier.

13. A computer program product comprising a computer-readable storage medium having computer-readable program code embodied therewith, the computer-readable program code configured to implement the steps of the method according to clause 1.

14. A database system being configured to connect to a centralized cache shared with other database systems, the database system being configured for receiving a request for processing data of at least one table of the database system; determining a unique identifier of a version of the table using a common identification method of the database systems; generating a database command for processing data of the table, the command referencing the identifier; determining if the cache comprises results of a same command with the same identifier; processing the command at the database system or retrieving the results of the command from the cache depending whether the cache comprises the results.

15. A cache system being configured to receive a query description and corresponding result of the query from one or more database systems, the cache system being configured to store a mapping of the received query descriptions in association with the results of the queries.

16. The cache system of claim 15, the mapping being stored in a lookup table having textual descriptions of queries as keys and results of the queries as values, the cache system being configured to: in response to receiving from a database system a request indicative of a textual description of a command, query the lookup table using the textual description and return a result of the querying to the database system.

17. A computer system comprising database systems of clause 14 and a cache system of clause 16.

18. A method for processing data of a database system, the database system being configured to connect to a centralized cache shared with other database systems; the method comprising: receiving a request for processing data of multiple tables of the database systems; for each of the multiple tables, determining a unique identifier of a version the table using a common identification method of the database systems; generating a database command for processing data of the multiple tables, the command referencing the multiple identifiers; decomposing the command into multiple subcommands that independently process tables of the multiple tables; determining if the cache comprises results of the same command or results of each of the subcommands; in case the results of the subcommands and the command are not present in the cache, processing the generated command; in case the results of the generated command are not present in the cache and the results of at least one of the subcommands are present in the cache: processing the at least one of the subcommands or retrieving their results from the cache, processing the subcommands for which the results are not present in the cache, and combining the results of the subcommands in accordance with the command in order to obtain the results of the command; and in case the results of the generated command are present in the cache processing the command or retrieving its results from the cache.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for processing data of a first database system, the first database system configured to connect to a remote centralized cache shared with other independent database systems, wherein the first database system and the other independent database systems each process commands independently on separate data stored locally in their respective separate database systems, the method comprising:
receiving, by the first database system, a request for processing data of a table of the first database system;
determining, by the first database system, a unique identifier of a version of the table of the first database system using a common identification method of the first database system and the other independent database systems;
generating, by the first database system, a database command for processing data of the table, the command referencing the identifier;
determining if the cache comprises results of a same command with the same identifier, wherein the cache comprises results of commands processed by the other independent database systems that can be retrieved by the first database system; and
processing the command at the first database system or retrieving the results of the command from the cache based on whether the cache comprises the results.

2. The method of claim 1, further comprising:
comparing a processing cost of processing the command by the first database system with a retrieving cost of retrieving the results from the cache, wherein the processing the command or retrieving the results is further based on the comparison result
wherein, in response to the cache comprising the result and the retrieving cost exceeding the processing cost, processing the command locally in the first database system instead of retrieving the results from the cache.

3. The method of claim 1, wherein the first database system comprises further tables, the method further comprising repeating the receiving, the determining a unique identifier, the generating, the determining if the cache comprises results of a same command with the same identifier, and the processing or retrieving for one or more tables of the further tables.

4. The method of claim 1, wherein the receiving of the request is performed before the determining of the unique identifier.

5. The method of claim 1, wherein the receiving of the request is performed after the determining of the unique identifier.

6. The method of claim 1, further comprising:
receiving, at the first database system, a query; and
determining, by a query planner of the first database system, a query plan for the query, the query plan comprising a subquery referencing the table, wherein the generated database command results from replacing the name of the table by the identifier in the subquery.

7. The method of claim 6, wherein the query plan comprises multiple subqueries referencing different tables, the method further comprising identifying the subquery using the name of the table.

8. The method of claim 6, wherein the query plan comprises further subqueries referencing the table, the method further comprising generating a further database command for each of the further subqueries by replacing the name of the table by the identifier in the further subquery, and repeating the determining if the cache comprises results of a same command with the same identifier and the processing for each of the further generated commands.

9. The method of claim 6, wherein the query plan comprises further subqueries referencing different tables of the first database system, the method further comprising:
identifying in the further subqueries, subqueries referencing tables which are located in both the first database system and one or more of the other independent database systems;
repeating the determining a unique identifier for each distinct table of the tables referenced in the identified subqueries; and
repeating the generating, the determining if the cache comprises results of a same command with the same identifier, and the processing for each of the identified subqueries.

10. The method of claim 1, further comprising, before determining the identifier, determining that at least one of the other independent database systems contains the table.

11. The method of claim 1, wherein the identifier of the table is determined using an ID table mapping table names to respective unique identifiers.

12. The method of claim 1, wherein determining the identifier comprises applying a hash function on the current content of the table for generating the identifier.

13. The method of claim 1, wherein the cache comprises a lookup table having textual descriptions of queries as keys and results of the queries as values, wherein determining if the cache comprises the results of the command comprises creating a textual description of the command and querying the lookup table using the textual description.

14. A computer program product for processing data of a first database system, the first database system configured to connect to a centralized cache shared with other independent database systems, wherein the first database system and the other independent database systems each process commands independently on data stored locally in their respective database systems, the computer program product comprising a computer-readable storage medium having computer-readable program code embodied therewith, the computer-readable program code executable by a processor to cause the processor to perform a method comprising:
receiving, by the first database system, a request for processing data of a table of the first database system;
determining, by the first database system, a unique identifier of a version of the table of the first database system using a common identification method of the first database system and the other independent database systems;
generating, by the first database system, a database command for processing data of the table, the command referencing the identifier;
determining if the cache comprises results of a same command with the same identifier wherein the cache comprises results of commands processed by the other independent database systems; and
processing the command at the database system or retrieving the results of the command from the cache based on whether the cache comprises the results.

15. The computer program product of claim 14, wherein the method further comprises:
comparing a processing cost of processing the command by the first database system with a retrieving cost of retrieving the results from the cache, wherein the processing the command or retrieving the results is further based on the comparison result.

16. The computer program product of claim 14, wherein the method further comprises:
receiving, at the first database system, a query; and
determining, by a query planner of the first database system, a query plan for the query, the query plan comprising a subquery referencing the table, wherein the generated database command results from replacing the name of the table by the identifier in the subquery.

17. A system, comprising:
a first database system configured to connect to a centralized cache shared with other independent database systems, the first database system comprising:
one or more processors; and
a computer-readable storage medium, coupled to the one or more processors, storing program instructions that, when executed by the one or more processors, cause the one or more processors to perform a method comprising:
receiving a request for processing data of a table of the first database system;
determining a unique identifier of a version of the table of the first database system using a common identification method of the first database system and the other independent database systems;
generating a database command for processing data of the table, the command referencing the identifier;
determining if the cache comprises results of a same command with the same identifier, wherein the cache comprises results of commands processed by the other independent database systems; and
processing the command at the first database system or retrieving the results of the command from the cache based on whether the cache comprises the results.

18. The system of claim 17, wherein the method further comprises:
comparing a processing cost of processing the command by the first database system with a retrieving cost of retrieving the results from the cache, wherein the processing the command or retrieving the results is further based on the comparison result.

19. A method for processing data of a first database system, the first database system being configured to connect to a centralized cache shared with other independent database systems, wherein the first database system and the other independent database systems each process commands independently on data stored locally in their respective database systems, the method comprising
receiving a request for processing data of multiple tables of the first database system;
for each of the multiple tables, determining, by the first database system, a unique identifier of a version of the table using a common identification method of the first database system and the other independent database systems;
generating, by the first database system, a database command for processing data of the multiple tables, the command referencing the multiple identifiers;
decomposing, by the first database system, the command into multiple subcommands that independently process tables of the multiple tables;
determining, by the first database system, if the cache comprises results of the same command or results of each of the subcommands;
in case the results of the subcommands and the command are not present in the
cache, processing the generated command locally in the first database system;
in case the results of the generated command are not present in the cache and the results of at least one of the subcommands are present in the cache:
retrieving the results of the at least one of the subcommands from the cache,
processing the subcommands for which the results are not present in the cache, and
combining the results of the subcommands in accordance with the command in order to obtain the results of the command; and
in case the results of the generated command are present in the cache retrieving its results from the cache.

20. The method of claim 1, wherein each database system stores materialized query tables locally in their respective database system for storing results of queries processed by the respective database system and stores results from the materialized query tables in the remote centralized cache.

* * * * *